Sept. 24, 1940.                O. STANKEY                2,215,985
                              HEADREST ALARM
                           Filed Oct. 27, 1938

Inventor
OSCAR STANKEY
By:- Ben V. Zillman
Attorney

Patented Sept. 24, 1940

2,215,985

UNITED STATES PATENT OFFICE 2,215,985

HEADREST ALARM

Oscar Stankey, East St. Louis, Ill.

Application October 27, 1938, Serial No. 237,203

4 Claims. (Cl. 177—311)

This invention relates to an alarm, and more particularly to an alarm that is adapted to be affixed to a motor vehicle, so that the driver may rest his head against a part of said alarm mechanism, the alarm remaining inactive during the normal positioning of the head thereagainst, but immediately coming into action as soon as the driver removes his head therefrom, as by nodding his head in falling into a sleep.

The invention has among its objects, the production of a device of the kind described, that will be neat and simple in appearance and construction, inexpensive, which will not interfere with the normal driving of the vehicle, be positive in action, and which will be otherwise satisfactory and efficient for use wherever deemed applicable.

One object of the invention is to so construct the device, that it may be either swung into inoperative position and out of its normal head-engaging position, or swung into said head-engaging position, simply and conveniently.

Another object of my invention is to provide a device of the kind described, that will be fixed to the roof of a motor vehicle, and which is adjustable to shift the head rest forwardly and downwardly so as to compensate for various thicknesses of car seats or changes in location of the same, for variations in size of different drivers, and for other reasons.

A further object of the invention is to provide a rest alarm of the kind set forth, with means for rendering the alarm means inoperative when it is desired to use the device simply as a head rest, and not as an alarm.

Many other objects and advantages of the construction herein shown and described will be obvious to those skilled in the art to which this invention appertains, as will be apparent from the disclosures herein given.

To this end, my invention consists in the novel arrangement, construction and combination of parts herein shown and described, and the uses mentioned, as will be more clearly pointed out in the claims hereunto appended.

In the drawing, wherein like reference characters indicate like or corresponding parts throughout the views.

Figure 1:
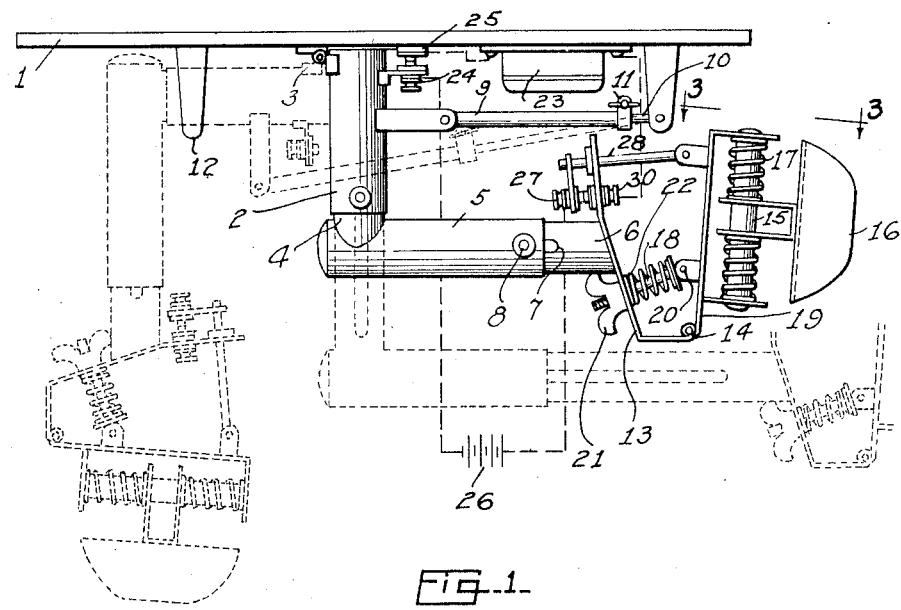
Figure 1 is a side elevation of my headrest alarm, in operative and inoperative positions.

Referring more particularly to the drawing, wherein I have illustrated a preferred embodiment of my invention, 1 indicates the under side of the roof of a motor vehicle, or a base for securement thereto, and from which my improved headrest alarm may be suspended so as to be in either of two positions, namely, in normal head-engaging position, or in inoperative position and swung entirely rearwardly and away from the driver, the last-mentioned position being indicated in the dotted lines to the left on the drawing of Fig. 1.

A tube 2 is pivotally secured at its upper end at 3 to the element 1, and telescopically receives an inner sleeve 4, and to the latter and extending at right angles therefrom is a tube 5. In similar manner, a sleeve 6 is telescopically received within and projects forwardly of the tube 5, these elements forming a carrier for the rest. In order to provide for relative adjustment between the parts of this carrier, so as to compensate for variations in distance, both vertically and horizontally, between the headrest and the head of the driver, the sleeves 3 and 6 may be provided with longitudinally extending slots 7 for receiving set screws 8 or other suitable locking means provided on the cooperating tubes 2 and 5. Fig. 1 shows the device in full lines in one desired adjustment, and in the dotted lines toward the bottom and to the right is shown another adjusted position of the headrest.

In order to insure that the carrying frame and the cooperating parts of the device are maintained in their operative or inoperative position, as the case may be, and that the same will travel in a plane, a sleeve 9 may be pivoted at one end 9 to the tube 2, said sleeve receiving a rod 10 whose far end is pivoted to the member 1, there being a locking element 11 for adjustably connecting the bar and sleeve together, somewhat as shown. A pair of clips 12 may be provided at some fixed supporting wall to detachably receive the tube element 2 when the device is swung to the left into inoperative position, and thus insure that the device will not be accidentally released and swing forwardly to hit the driver's head.

At the forward end of the sleeve 6 is a plate 13, to which is hinged at 14, a second plate carrying an upright post 15. The headrest proper is indicated at 16, and may be of any suitable size and shape to comfortably receive the back of the driver's head, being cushioned if so desired, and is mounted on said post 15 so as to permit of relative rotational movement of the headrest on the post, about the upright axis, and in addition, springs 17 may be interposed between the headrest and the ends of said post 15 to resiliently resist up and down movement of the rest on said post.

A bolt 18 is carried by the plate 19, the same being pivoted thereto at one end 20, and the other end extending freely through the plate 13 for engagement with a thumb screw 21 or other suitable adjusting fastener for moving the plates relatively of each other. A spring 22 is interposed between the two plates, on said bolt, to normally urge the plates apart.

The alarm may consist of a bell, buzzer, light or any other type of signal 23, and for the sake of convenience and clarity, one form of circuit indicated. The tube 2 may have one element 24 of a contact carried thereby, the other part of the contact being indicated at 25 and being permanently fixed to carry the current through the element 24 when the device is in the full-line position shown, but to cut the circuit completely when the device is thrown to the dotted line position indicated at the left in Fig. 1.

The element 25 leads to the battery 26, which is in turn connected through wiring to a movable contact element 27 carried on a pin 28 whose other end is pivoted to the plate 19, and if desired, a spring 29 may be interposed between said element 27 and plate 13. An element 30 is mounted on the plate 13 for cooperable engagement with said element 27, and the circuit continues by connecting the element 30 to the signal 23, the contact element 25 being similarly connected to said signal.

When the device is as shown in full lines in Fig. 1, and the driver is in his seat, he may lean his head upon the headrest, thereby tilting the latter rearwardly a slight amount controlled by the adjustment of the thumb screw 21 and spring 22. In such position, and while the head is thus nicely rested, the pair of contacts 27 and 30 are slightly separated and the alarm circuit is open, but as soon as the driver leans his head forwardly or perhaps nods in going to sleep, the springs actuate the head rest forwardly, sufficiently to close the pair of contact elements 27 and 30 and whereupon, the signal is either sounded or made visible, dependent upon the particular type of signal employed.

Figure 2:
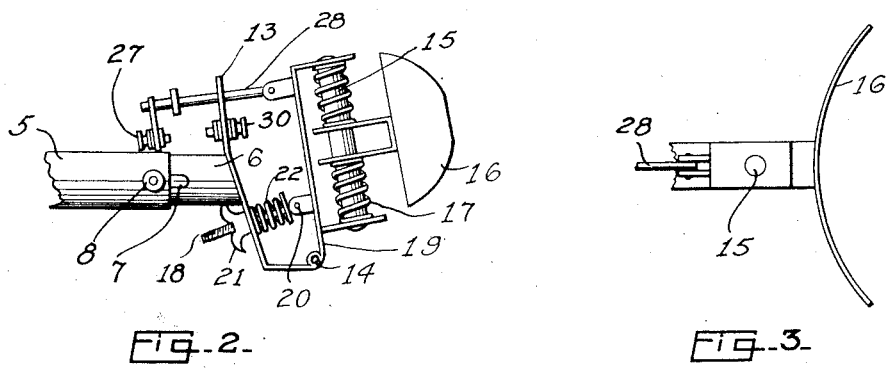
Figure 2 is a fragmentary detail, showing the headrest adjusted to throw the alarm into inoperative position.
Figure 3:
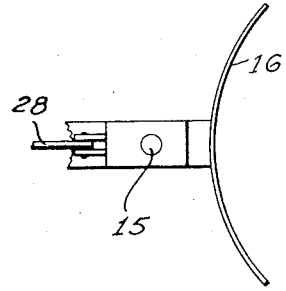
Figure 3 is a fragmentary top plan view, showing the shape of the head-engaging element of the device.

The thumb screw permits of some adjustment of the angle of the headrest, but if it is desired to use the device simply as a headrest without any alarm feature for temporary periods, one way of doing so is by tightening up the thumb screw so as to space the contact elements 27 and 30 far apart, as shown in Fig. 2, and whereupon even a forward movement of the head relatively of the head rest will not permit the springs to shift the said contact elements sufficiently close to engage and sound the alarm.

Having thus described my invention, it is obvious that various immaterial modifications may be made in the same without departing from the spirit of my invention; hence I do not wish to be understood as limiting myself to the exact form, arrangement, construction and combination of parts herein shown and described, or the uses mentioned, except as limited by the state of the art to which this invention appertains, or the claims hereunto appended.

What I claim as new and desire to secure by Letters Patent is:

1. An alarm for safe driving, comprising a signal, a headrest fixed on a motor vehicle, and arranged to engageably support the driver's head during driving, means between said signal and rest for rendering said signal inactive while the driver's head presses normally against said rest and rendering said signal active as soon as the driver shifts his head to release its pressure on said rest, and means to set said last-mentioned means to inoperative position.

2. In an alarm for use in driving a motor vehicle, a signal, a headrest normally engageable with the driver's head to control said signal, and means for mounting said rest to the roof of said vehicle to temporarily maintain said rest in operating position or completely out of contact with the driver's head.

3. In combination, a signal, a headrest movably fixed to a motor vehicle so as to be swung into or out of head-engaging position, means for adjusting said head rest vertically and horizontally without rotation of the same, a circuit between said rest and alarm for operating the latter when the driver's head is moved from its rest-engaging position during driving, and spring means normally urging said rest forwardly to control the operation of said circuit.

4. In a motor-vehicle alarm, a signal, a headrest adapted to be fixed on said vehicle, carrying means for said rest comprising telescopically connected elements pivotally connected at their upper end to the roof of the motor vehicle and pivotally connected at their other end to said headrest, a brace telescopically connected to said carrying means and roof to permit moving said carrying means into and out of operative position without rotation of the same, a pair of contact elements between said carrying means and headrest in the circuit of said signal, a spring intermediate said rest and carrying means to normally urge the rest forwardly to bring said pair of contacts together when the driver's head is moved forwardly, and means for adjusting the tension of said spring and limit the movement of said rest, whereby the maintaining of the driver's head within the rest during driving will maintain the signal inoperative, but as soon as the head is shifted forwardly the rest will shift similarly and the signal will operate.

OSCAR STANKEY.